(12) United States Patent
Seleznev et al.

(10) Patent No.: US 11,061,163 B2
(45) Date of Patent: Jul. 13, 2021

(54) PERMEABILITY DETERMINATIONS FROM WIDEBAND EM MODELS USING BOREHOLE LOGGING TOOLS

(71) Applicant: SCHLUMBERGER TECHNOLOGY CORPORATION, Sugar Land, TX (US)

(72) Inventors: Nikita V. Seleznev, Cambridge, MA (US); Tarek M. Habashy, Burlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 59 days.

(21) Appl. No.: 16/614,091

(22) PCT Filed: May 23, 2018

(86) PCT No.: PCT/US2018/034024
§ 371 (c)(1),
(2) Date: Nov. 15, 2019

(87) PCT Pub. No.: WO2018/217832
PCT Pub. Date: Nov. 29, 2018

(65) Prior Publication Data
US 2021/0157025 A1    May 27, 2021

Related U.S. Application Data

(60) Provisional application No. 62/510,399, filed on May 24, 2017.

(51) Int. Cl.
*G01V 3/30* (2006.01)
*G01V 3/38* (2006.01)

(52) U.S. Cl.
CPC . *G01V 3/30* (2013.01); *G01V 3/38* (2013.01)

(58) Field of Classification Search
CPC .......... G01V 3/28; G01V 3/38; G01V 99/005
See application file for complete search history.

(56) References Cited

U.S. PATENT DOCUMENTS 1,045,173 A    11/1912  Peck
8,027,794 B2 *  9/2011  Xie ........................... G01F 1/66
                                                       702/50

(Continued)

OTHER PUBLICATIONS

Ben Isreal, A. "A Newton-Raphson Method for the Solution of Systems of Equations", Journal of Mathematical Analysis and Applications, 1966, 15(2), 1966, pp. 243-252.

(Continued)

*Primary Examiner* — Alvaro E Fortich
(74) *Attorney, Agent, or Firm* — Trevor G. Grove

(57) ABSTRACT

A permeability log is generated by running borehole tools in a borehole traversing a formation, including at least electromagnetic (EM) tool providing at least a low-frequency complex conductivity measurement at least one frequency. Data from the EM tool and other data obtained from other tools are provided to a wideband EM model, where a data inversion is conducted to provide a plurality of outputs from which a cementation exponent may be calculated. The cementation exponent is used to find a formation factor at each depth of interest in the borehole, and the formation factor is used to find a permeability value which is used for the permeability log. The permeability log may be generated without the use of core data.

30 Claims, 7 Drawing Sheets

(56) References Cited

U.S. PATENT DOCUMENTS

| | | |
|---|---|---|
| 2008/0290874 A1 | 11/2008 | Seleznev et al. |
| 2010/0324826 A1 | 12/2010 | Luling |
| 2016/0040531 A1* | 2/2016 | Ramakrishnan ......... G01V 1/40 702/8 |
| 2016/0097876 A1* | 4/2016 | Freed ...................... G01V 3/24 703/2 |
| 2016/0139293 A1 | 5/2016 | Misra et al. |
| 2016/0178785 A1 | 6/2016 | Wilson et al. |
| 2016/0187521 A1 | 6/2016 | Homan et al. |

OTHER PUBLICATIONS

Brown, R. J. S., "Connection between formation factor for electrical resistivity and fluid-solid coupling factor in Biot's equations for acoustic waves in fluid-filled porous media", Geophysics, 1980 45(8), pp. 1269-1275.

Klein, L. A. et al., "An Improved Model for the Dielectric Constant of Sea Water at Microwave Frequencies," IEEE Transactions on Antennas and Propagation, vol. 25(1), 1977, pp. 104-111.

Maxwell-Garnett, J. C., "Colors in Metal Glasses and in Metal Films," Transaction of the Royal Society, vol. CCIII, 1904, pp. 385-420.

Moré, J. J., "The Levenberg-Marquardt Algorithm: Implementation and Theory", in Numerical Analysis. Lecture Notes in Mathematics, Watson, G. A. (eds), Springer Berlin Heidelberg, 1978, 630, pp. 105-116.

Revil, A. et al., "Determination of permeability from spectral induced polarization in granular media", Geophysical Journal International, 2010, 181(3), pp. 1480-1498.

Revil, A. et al., "Predicting permeability from the characteristic relaxation time and intrinsic formation factor of complex conductivity spectra", Water Resources Research, 2015, 51(8), pp. 6672-6700.

Seleznev, N.V. et al., "Formation Properties Derived from a Multi-Frequency Dielectric Measurement", SPWLA 47th Annual Logging Symposium, Society of Petrophysicists and Well-Log Analysts, 2006, 12 pages.

Sen, P. N. et al., "A Self-similar Model for Sedimentary Rocks with Applciation to the Dielectric Constant of Fused Glass Beads," Geophysics, 1981, 46(5), pp. 781-795.

Vinegar, H.J. et al., "Induced Polarization of Shaly Sands," Geophysics, 1984, 49(8), pp. 1267-1287.

Weller, A. et al., "Permeability prediction based on induced polarization: Insights from measurements on sandstone and unconsolidated samples spanning a wide permeability range", Geophysics, 2015, 80(2), pp. D161-D173.

Search Report and Written Opinion of International Patent Application No. PCT/US2018/034024 dated Nov. 15, 2018, 10 pages.

International Preliminary Report on Patentability of International Patent Application No. PCT/US2018/034024 dated Dec. 5, 2019, 7 pages.

* cited by examiner

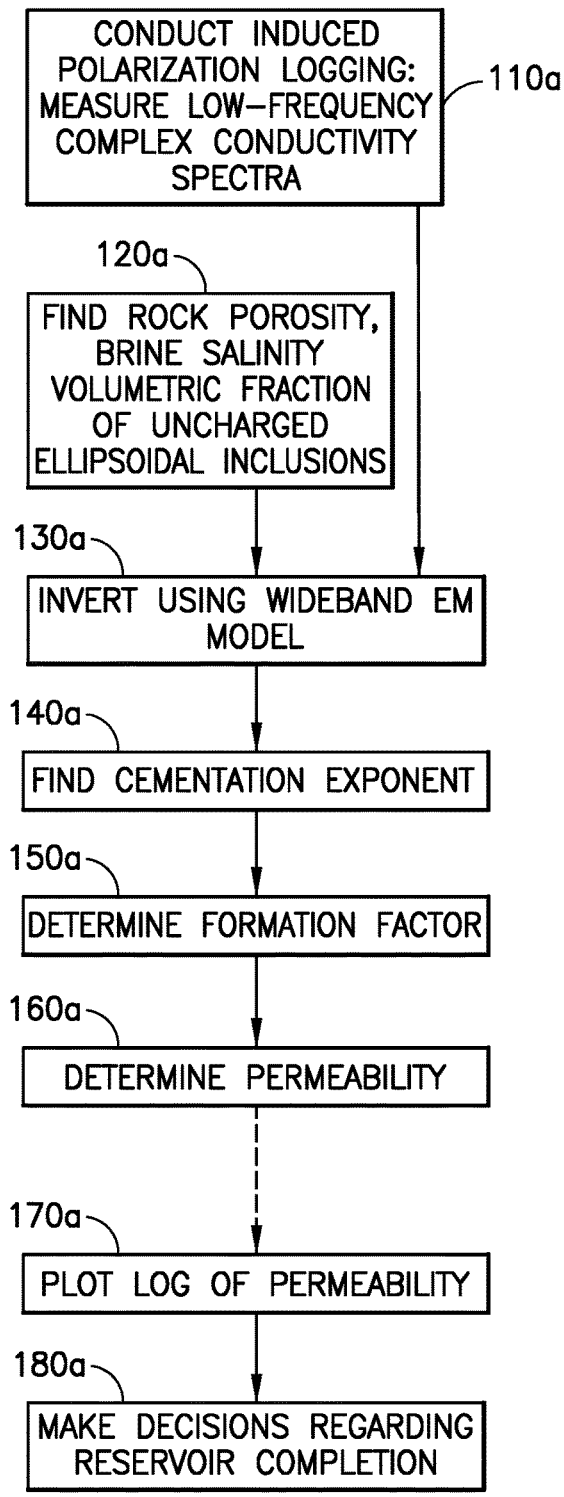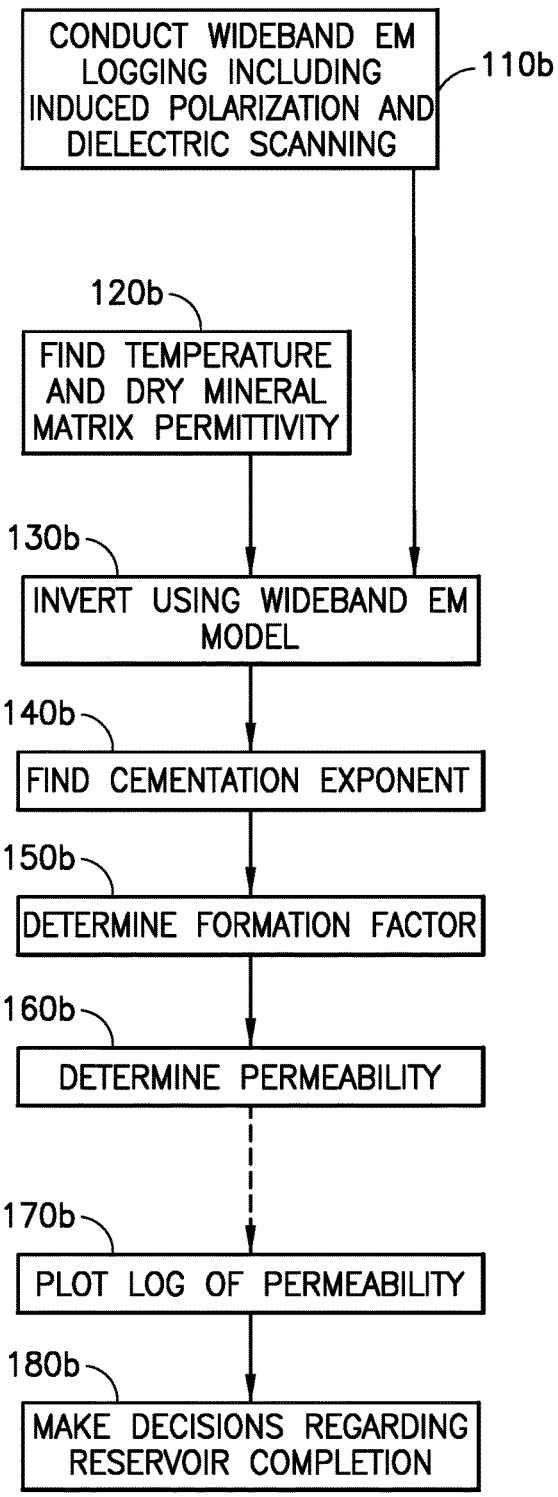
FIG.3A
FIG.3B

PERMEABILITY DETERMINATIONS FROM WIDEBAND EM MODELS USING BOREHOLE LOGGING TOOLS

CROSS REFERENCE TO RELATED APPLICATIONS

This application claims priority from U.S. Provisional Application Ser. No. 62/510,399 filed May 24, 2017 and is related to U.S. Ser. No. 15/336,494 filed Oct. 27, 2016, entitled "Evaluation of Formation Utilizing Wideband Electromagnetic Measurements", both of which are herein incorporated by reference in their entirety.

FIELD OF THE DISCLOSURE

The subject disclosure relates to formation evaluation. More particularly, the subject disclosure relates to methods of using borehole logging tools to generate a permeability log.

BACKGROUND

A formation having a reservoir of hydrocarbons is a valuable asset if the hydrocarbons in the formation are producible. Optimal choices of completion techniques and economic production of an oilfield reservoir require knowledge of the formation hydraulic permeability, which is defined as the ability of a rock to transmit fluids. Permeability measurements are also important in near-surface geophysics for predicting fluid flow in aquifers.

Permeability is typically measured in the units of darcies or millidarcies. A medium with a permeability of 1 darcy permits a flow of 1 $cm^3$/second of a fluid with a viscosity of 1 cP (1 mPa-sec) under a pressure gradient of 1 atm/cm acting across an area of 1 $cm^2$. Typical permeability of oilfield formations varies from several darcies in unconsolidated sediments to nanodarcies in organic shale reservoirs. Formations that transmit fluid readily, such as sandstones, are described as permeable and tend to have many large, well-connected pores. Impermeable formations, such as shales and siltstones, tend to be finer grained or of a mixed grain size, with smaller, fewer, or less interconnected pores. Absolute permeability is the measurement of the permeability conducted when a single fluid, or phase, is present in the rock.

A log of absolute permeability is valuable in evaluating whether the formation can produce hydrocarbons and in choosing optimum reservoir completion and simulation strategies. Highly-permeable formations often do not require additional reservoir stimulation and are able to produce hydrocarbons after standard (casing) perforation procedures. Less permeable formations, such as tight sandstones, may require limited hydraulic fracturing to increase contact with the reservoir and, consequently, a flow of hydrocarbons into the well. Low-permeability formations, such as organic shales, require the drilling of horizontal wells and multistage hydraulic fracturing techniques in order to produce economical quantities of hydrocarbons from the formation.

Published methods of predicting formation permeability and generating a permeability log from conductivity measurements generally cannot be accomplished solely through borehole logging as they require a knowledge of the electrical formation factor. A standard method to derive the formation factor is to perform multi salinity measurements on a core sample extracted from the formation. While the extraction of core samples may be useful for many purposes, core sampling is a tedious, time consuming, and expensive process. Accordingly, the presently published methods cannot be directly applied to borehole data to derive formation permeability unless the formation factor value is assumed. However, the formation factor can vary significantly between formations and has a strong impact on the permeability prediction, so when the formation factor is assumed, the resulting permeability prediction is prone to large error.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In the subject disclosure, methods are disclosed which enable continuous permeability logging from electromagnetic (EM) measurements. Hydraulic permeability can be evaluated from low-frequency complex conductivity measurements with external inputs of several petrophysical parameters and utilizing a wideband EM model such as a model presented in previously incorporated U.S. Ser. No. 15/336,494. Hydraulic permeability can likewise be evaluated utilizing wideband EM measurements and a wideband EM model with minimal parameters required as input. The so-determined permeability can be presented as a log as a function of formation depth, and decisions regarding reservoir completion and/or simulation strategies may be made based on the permeability log.

Other aspects and advantages of the invention will be apparent from the following description and the appended claims.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein:

FIG. 3a is a diagram showing a workflow for using low-frequency complex conductivity logging tool measurements with a wideband EM model to determine formation permeability;

FIG. 3b is a diagram showing a workflow for wideband EM logging tool measurements with a wideband EM model to determine formation permeability;

DETAILED DESCRIPTION

Figure 1:
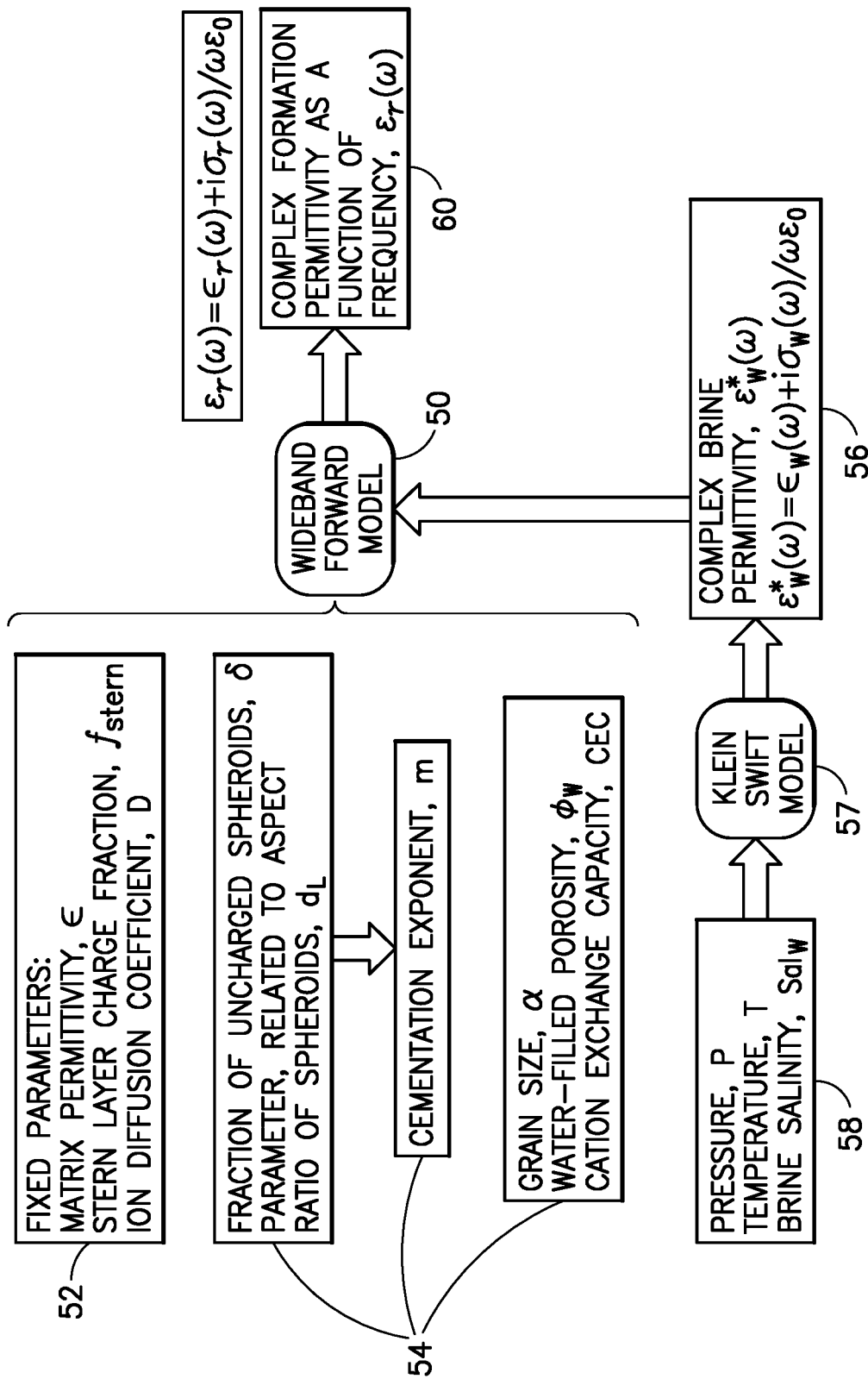
FIG. 1 is a diagram showing the input parameters and the outputs of a wideband EM forward model.

The particulars shown herein are by way of example and for purposes of illustrative discussion of the examples of the subject disclosure only and are presented in the cause of providing what is believed to be the most useful and readily understood description of the principles and conceptual aspects of the subject disclosure. In this regard, no attempt is made to show structural details in more detail than is necessary, the description taken with the drawings making apparent to those skilled in the art how the several forms of the subject disclosure may be embodied in practice. Furthermore, like reference numbers and designations in the various drawings indicate like elements.

Various electromagnetic (EM) logging tools operate at different frequencies. Induced polarization logging tools generally operate in the range of frequencies from DC or milliHz to hundreds of KHz. It should be appreciated that the induced polarization measurements can be realized in both the time domain and the frequency domain. In the frequency domain, the induced polarization measurements constitute the measurement of the complex formation conductivity as a function of frequency and are referred to as the "Spectral Induced Polarization" or SIP measurements. In the time domain, induced polarization measurements constitute the measurement of the formation polarization magnitude decay versus time.

Lateralog tools (such as the DLL® tool) generally use an electrode for injecting current into a formation and one or more electrodes for measuring current returning from the formation to the tool. Laterolog-type resistivity measurements typically operate in the range of tens to hundreds of Hertz (Hz).

Induction-type tools (such as the AIT—Array Induction Imager tool of SCHLUMBERGER®) include a transmitter coil and one or more receiver coils that are spaced from the transmitter coil. The transmitter coil is driven by an alternating current that creates a primary magnetic field around the transmitter coil(s). The primary magnetic field causes eddy currents to flow in a formation which in turn generate a secondary magnetic field which induces an alternating voltage in the receiver coils. Induction-type resistivity measurements often operate in the range of one kiloHertz (kHz) to tens or even hundreds of kHz.

Propagation-type resistivity tools (such as the arcVISION® tool of SCHLUMBERGER®) generally operate in the range of hundreds of kHz to the single or even tens of megaHertz (MHz).

Dielectric logging tools (such as the Dielectric Scanner of SCHLUMBERGER®) may include an antenna array with collocated transverse and longitudinal transmitters and receivers set on an articulated pad that is in contact with the borehole wall. The dielectric logging tools generally operate in the range of tens of MHz to the gigaHertz (GHz). Propagation of electromagnetic waves is controlled by the conductivity and dielectric permittivity of the medium in which the waves are propagating thereby allowing for evaluation of the dielectric dispersion, i.e., the change in dielectric properties as a function of frequency. Analysis of dielectric dispersion allows for the separation and quantification of the different effects influencing the dielectric measurement, such as water volume, water salinity and rock texture.

Also note that there is a broad array of EM laboratory equipment that measures electromagnetic response data for rock samples of a formation in order to characterize petrophysical properties of such formation. Similar to the EM logging tools as described above, such EM laboratory equipment operates over a wide range of different frequencies.

For purposes herein, the electromagnetic response data acquired by these various EM logging tools and laboratory equipment can be measured in the frequency domain or the time domain. If needed, electromagnetic response data measured in the frequency domain can be converted to the time domain using methods well known in the art such as inverse Fourier transforms, or electromagnetic response data measured in the time domain can be converted to the frequency domain using methods well known in the art such as Fourier transforms.

According to one aspect, in a low-frequency range or sub-band (which in embodiments can include one or more frequencies less than 100 KHz, the EM response data measured for the formation is sensitive to and even dominated by the induced polarization of the formation. Thus, this low-frequency range may be referred to as the "induced polarization domain." The induced polarization of the formation is a measure of the complex electrical conductivity of the formation at low frequencies. Induced polarization can be observed when a steady current through two electrodes in contact with the formation is shut off: the voltage does not return to zero instantaneously, but rather decays slowly, indicating an unusually strong polarization response in the rock. This strong polarization response often occurs due to the presence of charge-bearing or conducting minerals that give large induced dipole moment upon the application of electric field. Induced polarization can be measured in the time domain by observing the rate of decay of voltage, or in the frequency domain by measuring phase shifts between sinusoidal currents and voltages. In one embodiment, the low frequency sub-band can include frequencies that encompass the range from milliHz to 1 KHz (the EM response data in this frequency range is particularly useful for characterizing quartz or quartz-like rock). In another embodiment, the low frequency sub-band can include frequencies that encompass the range from one Hz to 100 KHz (the EM response data in this frequency range is particularly useful for characterizing clay-bearing rock). In yet another embodiment, the low frequency sub-band can include frequencies that encompass the range from one milliHz to 100 KHz (the EM response data in this frequency range is particularly useful for characterizing both quartz and clay-bearing rock). In all of these embodiments, the low frequency sub-band can include one more frequencies that fall outside of the specified range if desired.

In contrast, in a high-frequency range or sub-band (which in embodiments includes one or more frequencies greater than 10 MHz), the EM response data measured for the formation is sensitive or even dominated by the complex electrical permittivity of the formation. Thus, this high-frequency range may be referred to as the "dielectric domain." In one embodiment, the high frequency sub-band can include one or more frequencies that fall within the range from tens of MHz to tens of GHz. In another embodiment, the high frequency sub-band can include one or more frequencies at or near one GHz. In yet another embodiment, the high frequency sub-band can include one or more frequencies that fall within the range from 10 to 20 MHz. In all of these embodiments, the high frequency sub-band can include one or more frequencies that fall outside of the specified range if desired.

Thus, the EM response data measured for a formation in different frequency ranges is controlled by different phenomena. Consequently, EM measurements made by one or more tools or laboratory equipment at different frequencies can have different, and in some cases unique sensitivities to the petrophysical properties of the formation. The following table illustrates the EM measurement sensitivities in different frequency ranges.

| Petrophysical Property | Dielectric Domain— Real Permittivity | Dielectric Domain— Imaginary Permittivity | Induced Polarization Domain— Real Conductivity | Induced Polarization Domain— Imaginary Conductivity |
|---|---|---|---|---|
| Grain Size | None | None | None | Strong |
| Grain shape | Strong | Strong | Medium | Low |
| Qv (CEC) | Medium | Medium | Medium | Strong |
| Water-filled porosity | Strong | Strong | Medium | Low |
| Salinity | Medium | Strong | Strong | Medium |

In embodiments, formation evaluation will be based on the inversion of the wideband EM response data of a formation obtained in both the dielectric and induced polarization domains. Analysis of the wideband EM response data provides complementary sensitivities to the petrophysical parameters of the formation and yields more robust results than previously. The wideband EM response data or "wideband data" includes data (referred to herein as "low-frequency EM response data") derived from EM measurements at frequencies that fall within the low frequency sub-band or induced polarization domain as well as data (referred to herein as "high-frequency EM response data") derived from EM measurements at frequencies that fall within the high frequency sub-band or dielectric domain. The combination of the high-frequency EM response data and the low-frequency EM response data as part of the wideband data enables new applications, including, but not limited to determining a variety of parameters that characterize petrophysical properties of the formation such as grain size a and grain shape, CEC, Qv (CEC/unit pore volume), water-filled porosity $\phi_w$, water salinity $Sal_w$, cementation exponent m, fraction of uncharged spheroids p and a parameter related to the aspect ratio of the spheroids $d_L$.

More particularly, as seen in the provided table, while high-frequency EM response data has higher sensitivity to grain shape of the formation, the low-frequency EM response data has stronger sensitivity to grain size a of the formation. Inversion of wideband data can provide information about both the grain size a and grain shape of the formation. The grain shape information allows evaluation of formation textural parameters such as the cementation exponent m. Inversion for more complex textural parameters such as grain size distribution of the formation is also possible providing sufficiently detailed low-frequency EM response data is available.

It is also seen in the provided table that there is a strong sensitivity of Qv to the low-frequency imaginary conductivity of the formation. Given the medium sensitivity of Qv to the high-frequency dielectric permittivity, more robust values or an extended salinity range for the Qv estimate may be obtained from inversion of the wideband data. For example, in Vinegar, H. J. and Waxman, M. H. "Induced Polarization of Shaly Sands," Geophysics, Vol. 49(8), 1984, pp. 1267-1287, it was demonstrated that there is a correlation between imaginary conductivity and Qv for NaCl solutions with concentrations up to 2.0M. This salinity corresponds to 117 ppk NaCl solution concentration, which is significantly higher than the salinity cutoffs for Qv (or CEC) determination from the high-frequency data for samples with comparable porosity.

With respect to water-filled porosity $\phi_w$ of the formation, as seen in the provided table, high-frequency complex permittivity is very sensitive to the water-filled porosity $\phi_w$ of the formation and this is one of its primary petrophysical outputs. Petrophysical interpretation of the real and imaginary conductivity in the low-frequency EM response data can strongly benefit from an accurate input for the water-filled porosity $\phi_w$.

Both the imaginary part of the permittivity and the real part of the conductivity are sensitive to water salinity $Sal_w$ of the formation (which can also be referred to as "brine salinity"). However, the exact dependencies are different in different frequency domains that will make the determination of water salinity $Sal_w$ more robust. Alternatively, water salinity $Sal_w$ of the formation can be determined from the measured EM response data in a single domain (e.g., the dielectric domain or high-frequency range) and used as an input to interpret EM response data in the other domain (e.g., the induced polarization domain or low-frequency range).

It will be appreciated that the low-frequency EM response data of a formation (which corresponds to the induced polarization domain) can be measured by at least one EM logging tool as described above. Such EM logging tool(s) can include i) an induced polarization logging tool, whose operating frequency is generally in the range of frequencies from DC or milliHz to hundreds of KHz; ii) a Laterolog-type resistivity logging tool, whose operating frequency is generally in the range of frequencies from tens to hundreds of Hertz (Hz); and iii) an induction-type logging tool, whose operating frequency is generally in the range of frequencies from one kiloHertz (kHz) to tens or even hundreds of kHz.

It should also be appreciated that the high-frequency EM response data of the formation (which corresponds to the dielectric domain) can be measured by at least one EM logging tool as described above. Such EM logging tool(s) can be a dielectric logging tool, whose operating frequency is generally in the range of tens of MHz to the gigaHertz (GHz). According to one aspect, a wideband model, which is referred to as a wideband grain polarization model, accounts for two key polarization mechanisms present in oilfield formations: the polarization on the interfaces between the conductive fluid and non-conductive mineral grains and/or non-conductive hydrocarbons, and the polarization of the electrical double layer present on charged mineral grains.

The wideband grain polarization model considers spherical charged inclusions with surface charge density, $\Gamma_0$, which can be related to the cation exchange capacity (CEC) according to:

$$\frac{\Gamma_0}{a} = \frac{\varrho}{3e_0}\left(\frac{CEC}{100}\right)(1-f_{stern}) \times \text{units} \qquad (1)$$

where $0 < f_{stern} < 1$ is the factor associated with the fraction of ions in the Stern layer that reduces the mobile ions in the diffuse part of the electrical double layer, $e_0$ is the absolute value of an electron charge, $\varrho$ is the density in g/cm², a is the radius of the spherical grain, and the units=9.64×10⁷ convert the CEC from meq/100 g to coulombs. It also includes non-charged spheroidal inclusions that reflect changes in texture between different rocks and is related to changes in the cementation exponents of the rock. The volume fraction of the spheroidal inclusions in the rock matrix will be designated asp and the volume fraction of the charged spherical inclusions is 1−p where 0<p<1.

For a charged spherical particle immersed in a brine, the polarization coefficient $P^{sphere}$ is given by:

$$P^{sphere} = \frac{\varepsilon_m - \left(\varepsilon_w + i\frac{\sigma_w^{ex}}{\omega\varepsilon_0}\right)}{\varepsilon_m + 2\left(\varepsilon_w + i\frac{\sigma_w^{ex}}{\omega\varepsilon_0}\right)} \quad (2)$$

where $\omega=2\pi f$ is the radial frequency, $\varepsilon_0$ is the vacuum permittivity, $\varepsilon_w$ is the complex dielectric constant of the brine, $\varepsilon_m^*$ is the effective complex dielectric constant of a charged grain, and $\sigma_w^{ex}$ is the extra conductivity induced by the charged grain.

The complex dielectric constant of a charged grain $\varepsilon_m$ is defined as:

$$\varepsilon_m^* = \varepsilon_m + i\frac{\Gamma_0 \sigma_w}{N_0 a}\frac{1}{\omega\varepsilon_0}. \quad (3)$$

In equation (3), the first term $\varepsilon_m$ is the real dielectric constant of the grain matrix and $\sigma_w=2D(Ze_0)^2N_0/(k_BT)$ is the intrinsic brine conductivity with the ion concentration $N_0$. The second term of equation (3) comes from the additional conductivity due to charges carried by the spherical particle. The extra conductivity $\sigma_w^{ex}$ is defined as:

$$\sigma_w^{ex} = \frac{\Gamma_0 \sigma_w}{N_0 a}\frac{1}{y}, y = \frac{\lambda^2 a^2 + 2\lambda a + 2}{\lambda a + 1}, \lambda = e^{-i\pi/4}\sqrt{\frac{\omega}{D}}. \quad (4)$$

Here, the ion charge is $Ze_0$, the diffusion coefficient is D, $e_0$ is the absolute value of an electron charge, $k_B$ is the Boltzmann constant, and T is the temperature in degrees Kelvin. It is noted that:

$$\frac{\Gamma_0 \sigma_w}{N_0 a} = \frac{2D(Ze_0)^2 \Gamma_0}{ak_B T}, \quad (5)$$

which does not depend on brine conductivity explicitly. Hence, both $\varepsilon_m^*$ and $\sigma_w^{ex}$ are treated as part of grain properties in the differential effective medium inclusion process discussed hereinafter.

Polarization coefficients of an uncharged spherical grain $P_\alpha^{spheroid}$ for α=x, y, z directions are given by:

$$P_\alpha^{spheroid} = \frac{1}{3}\frac{\varepsilon_m - \varepsilon_w}{L_\alpha \varepsilon_m + (1-L_\alpha)\varepsilon_w} \quad (6)$$

where $L_\alpha$ is the depolarization factor in the α direction, which is related to the aspect ratio of the spheroid and follows the relation $L_{x,y}=(1-L_z)/2$. It is often convenient to define $L_z=1-d_L$, and $L_{x,y}=d_L/2$, where $d_L$ is a parameter depending only on the aspect ratio of spheroids.

To derive properties of a dense mixture, methods may be employed similar to the method presented in Sen et al., "A Self-similar Model for Sedimentary Rocks with Applciation to the Dielectric Constant of Fused Glass Beads," Geophysics, Vol. 46(5), 1981, pp. 781-795. In particular, using the differential effective medium approximation where a small volume of grains, $dV_m$ is added to the host in an infinitesimal step, a differential equation can be derived that represents the change of the complex dielectric constant for each infinitesimal step according to:

$$\frac{d\varepsilon}{\varepsilon} = \frac{dV_m}{V_w+V_m} + \left\{ p\left[\frac{\varepsilon_m - \varepsilon}{(1-d_L)\varepsilon_m + d_L\varepsilon} + 2(1\,f_a)\frac{\varepsilon_m - \varepsilon}{d_L\varepsilon_m - (2-d_L)\varepsilon}\right] + \right. \quad (7)$$
$$\left. 3(1p)\frac{\varepsilon_c - i\sigma_w^{ex}/(\omega\varepsilon_0) - \varepsilon}{\varepsilon_c + 2i\sigma_w^{ex}/(\omega\varepsilon_0) + 2\varepsilon}\right\}$$

where $f_a$ is the alignment factor defined along the z-axis and p is the volume fraction of spheroids. As a result, fractions of non-charged spheroids aligned in each direction are given by $p_z=pf_a$ and $p_x=p_y=p(1-f_a)/2$ respectively. In addition, it is assumed that water is the initial phase of the host with the volume $V_w$. By defining the volume faction of the matrix $\tau=V_m/(V_w+V_m)$, it follows that $d\tau/(1-\tau)=dV_m/(V_w+V_m)$. Now, performing the integration of τ from τ=0 to τ=1−φ for rock porosity φ and the effective dielectric constant $\varepsilon_r$, the following mixing formula can be derived for a single grain size:

$$\phi = \prod_{j=0}^{3}\left(\frac{\varepsilon_w - p_j}{\varepsilon_r - p_j}\right)^{r_j}. \quad (8)$$

Here $p_j$ and $r_j$ are poles and residues of the rational function $f(\varepsilon)=D(\varepsilon)/\varepsilon N(\varepsilon)$ with $$N(\varepsilon) = pf_a(\varepsilon_m\varepsilon)[d_L\varepsilon_m + (2d_L)\varepsilon]\left[\varepsilon_m + \frac{2i\sigma_w^{ex}}{\omega\varepsilon_0} + 2\varepsilon\right] + \quad (9)$$
$$2p(1f_a)(\varepsilon_m\varepsilon)[(1d_L)\varepsilon_m + d_L\varepsilon]\left[\varepsilon_m + \frac{2i\sigma_w^{ex}}{\omega\varepsilon_0} + 2\varepsilon\right] +$$
$$(1p)\left[\varepsilon_m \frac{i\sigma_w^{ex}}{\omega\varepsilon_0}\varepsilon\right][(1d_L)\varepsilon_m + d_L\varepsilon][d_L\varepsilon_m + (2d_L)\varepsilon]$$

and $$D(\varepsilon) = [(1\,d_L)\varepsilon_m + d_L\varepsilon][d_L\varepsilon_m + (2\,d_L)\varepsilon][\varepsilon_m + 2i\sigma_w^{ex}/(\omega\varepsilon_0) + 2\varepsilon]. \quad (10)$$

The cementation exponent m can be further calculated according to:

$$m = (1p)\frac{3}{2} + p\frac{2f_a + d_L(2-3f_a)}{d_L(2-d_L)}. \quad (11)$$

The cementation exponent m is associated with a parameter in Archie's law that relates electrical conductivity, $\sigma_0$, of fully brine-saturated rock to its porosity, φ, and brine conductivity, $\sigma_w$, according to $\sigma_0=\sigma_w/\phi^m$. In addition, $F=\phi^{-m}$ is often referred to as the formation factor and is related to the electrical tortuosity defined as $\alpha=F\phi=\phi^{1-m}$. See, e.g., Brown, R. J. S., "Connection between Formation Factor for Electrical Resistivity and Fluid-Solid Coupling Factor in Biots' Equations for Acoustic Waves in Fluid-Filled Porous Media," Geophysics, Vol. 45(8), 1980, pp. 1269-1275.

Other mixing rules that relate properties of the rock (such as porosity) to the high-frequency EM response data of the formation (which corresponds to the dielectric domain) can be used if desired. For example, one such mixing rule is the Bruggeman mixing rule. Another suitable mixing rule is the Maxwell-Garnett mixing rule as described by Maxwell-Garnett, J. C., "Colors in Metal Glasses and in Metal Films," Transaction of the Royal Society, vol. CCIII, 1904, pp. 385-420. Other mixing laws known in the art can also be used.

For multiple grain sizes, equation (8) may be expanded as follows:

$$\phi = \prod_{j=0}^{4} \left( \frac{\varepsilon_w - p'_j}{\varepsilon_r - p'_j} \right)^{r'_j} \quad (12)$$

where $p_j'$ and are poles and residues of the rational function $f_2(\varepsilon) = D_2(\varepsilon)/\varepsilon N_2(\varepsilon)$ with $$N_2(\varepsilon) = Pf_a(\varepsilon_m \varepsilon) \left[ d_L \varepsilon_m + \right. \quad (13)$$

$$(2d_L)\varepsilon \left[ \varepsilon_{m,1} + \frac{2i\sigma_{W,1}^{ex}}{\omega\varepsilon_0} + 2\varepsilon \right] \left[ \varepsilon_{m,2} + \frac{2i\sigma_{W,2}^{ex}}{\omega\varepsilon_0} + 2\varepsilon \right] +$$

$$2p(1f_a)(\varepsilon_m \varepsilon)[(1d_L)\varepsilon_m + d_L \varepsilon] \left[ \varepsilon_{m,1} + \frac{2i\sigma_{W,1}^{ex}}{\omega\varepsilon_0} + 2\varepsilon \right] \left[ \varepsilon_{m,2} + \right.$$

$$\left. \frac{2i\sigma_{W,2}^{ex}}{\omega\varepsilon_0} + 2\varepsilon \right] + 3(1p)s_1)$$

$$((1d_L)\varepsilon_m + d_L\varepsilon)(d_L \varepsilon_m + (2d_L \varepsilon)) \left[ \varepsilon_{m,1} \frac{i\sigma_{W,1}^{ex}}{\omega\varepsilon_0} \varepsilon \right] \left[ \varepsilon_{m,2} + \right.$$

$$\left. \frac{2i\sigma_{W,2}^{ex}}{\omega\varepsilon_0} + 2\varepsilon \right] + 3(1p)s_1((1d_L)\varepsilon_m +$$

$$d_L\varepsilon)(d_L \varepsilon_m + (2d_L\varepsilon)) \left[ \varepsilon_{m,1} + \frac{2i\sigma_{W,1}^{ex}}{\omega\varepsilon_0} + 2\varepsilon \right] \left[ \varepsilon_{m,2} \frac{i\sigma_{W,2}^{ex}}{\omega\varepsilon_0} \varepsilon \right]$$

and $$D_2(\varepsilon) = ((1d_L)\varepsilon_m + d_L\varepsilon) \quad (14)$$

$$(d_L\varepsilon_m + (2d_L)\varepsilon) \left[ \left( \varepsilon_{m,1} + \frac{2i\sigma_{W,1}^{ex}}{\omega\varepsilon_0} \right) + 2\varepsilon \right] \left[ \left( \varepsilon_{m2} + \frac{2i\sigma_{W,2}^{ex}}{\omega\varepsilon_0} \right) + 2\varepsilon \right]$$

Again, p is the volume fraction of the spheroidal (quartz) grains and $f_a$ is the alignment factor defined in the z-direction. The fraction of charged spheres with radius $a_1$ is given by $s_1$, while that with radius $a_2$ is $s_2 = 1-s$. Hence, the volume fractions of two different sized spheres are $f_{s,1} = (1-p)s_1$ and $f_{s,2} = (1-p)(1-s_1)$, respectively.

Similar to the earlier case, $\varepsilon^*_{m,i}$ are effective dielectric constants of charged spheres with two different radius, $a_1$ and $a_2$, and are defined as:

$$\varepsilon_{m,i} = \varepsilon_m + i\frac{\Gamma_i \sigma_w}{N_0 a_i} \frac{1}{\omega\varepsilon_0}. \quad (15)$$

In addition, extra water conductivities $\sigma_{w,j}^{ex}$ are given by:

$$\sigma_{w,i}^{ex} = \frac{\Gamma_i \sigma_w}{N_0 a_i} \frac{1}{y_i}, \; y_i = \frac{\lambda^2 a_i^2 + 2\lambda a_i + 2}{\lambda a_i + 1}, \; \lambda = e^{i\pi/4}\sqrt{\omega/D}, \quad (16)$$

with surface charge densities, $\Gamma_1$ and $\Gamma_2$, associated with two different sizes of spheres respectively. Finally, the surface charge density $\Gamma_i/a_i$ can be related to the $CEC_i$ corresponding to two different sized spheres as:

$$\frac{\Gamma_i}{a_i^-} \frac{g}{3e_0} \left( \frac{CEC_i}{100} \right)(1 f_{stem}) \times \text{units.} \quad (17)$$

According to one aspect, the addition of the hydrocarbon phase can be done by lumping it with the matrix phase into a single "non-conductive" phase with the Complex Refractive Index Method (CRIM) or any other dielectric mixing law. CRIM is defined as follows:

$$\varepsilon_{eff}^{1/2} = \sum_{j=1}^{N} \phi_n \varepsilon_n^{1/2}, \quad (18)$$

where $\varepsilon_{eff}$ is the effective permittivity of the composite $\phi_n$ and $\varepsilon_{eff}$ are the volumetric fractions and permittivities of the mixture constituents. Hydrocarbons can also be added by including them as a separate phase into the mixing law.

It is noted that equations such as equations (8) and (12) may be extended to model any grain size distribution such that the grain size distribution may be represented by a discrete probability density function or a continuous probability density function such as a Gaussian distribution.

It will be appreciated that models such as equations (8) and (12) have responses to changes in the input parameters. The model response can be predicted by the equations. Instead of water conductivity, salt (NaCl) water salinity in parts per thousand (ppk) may be utilized. An empirical model allowing the conversion of water temperature and salinity into the water conductivity and permittivity over the low-frequency and the high-frequency ranges is presented in Klein, L., and Swift, C., "An Improved Model for the Dielectric Constant of Sea Water at Microwave Frequencies," IEEE Transactions on Antennas and Propagation, Vol. 25(1), 1977, pp. 104-111.

In one aspect, a wide-band inversion on synthetic data was conducted. The sythnetic data was simulated by varying the following model parameters: water-filled porosity ($\phi_w$), cation exchange capacity (CEC), fraction of the spheroidal inclusions (p), a parameter related to the aspect ratio of spheroids ($d_L$), the grain size (a), and the water salinity ($Sal_w$). The cementation exponent, m, can be calculated from these model parameters. The wideband inversion used the wideband model that was previously presented. As shown in FIG. 1, the input parameters into the wideband model 50 include fixed parameters 52 such as the matrix permittivity the Stern layer charge fraction $f_{stern}$, and the ion diffusion coefficient D, as well as the previously mentioned varying parameters 54, and the frequency dependent complex brine permittivity ($\varepsilon^*_w(\omega)$) 56. The complex brine permittivity is obtained from a Klein-Swift or other water model 57 which utilizes known variable inputs 58 such as pressure P, temperature T, and brine salinity $Sal_w$. The complex brine permittivity is calculated according to $\varepsilon^*_w(\omega) = \varepsilon_w(\omega) + i\sigma_w(\omega)/\omega\varepsilon_0$. The output 60 of the forward model 50 is the complex formation permittivity as a function of frequency, $\varepsilon^*_r(\omega) = \varepsilon_r(\omega) + i\sigma_r(\omega)/\omega\varepsilon_0$.

Laboratory or downhole measurements provide wideband complex formation permittivity as a function of frequency. The target of petrophysical evaluation is to obtain input model parameters from the measured formation response. In one aspect, a direct analytical solution to derive an input parameter is difficult for the wideband model as described above. Thus, according to one embodiment, an inversion approach can be adopted where unknown model parameters are derived by iteratively changing input model parameters to minimize discrepancy or difference between the measured formation response and the predicted formation response. In each iteration, the predicted formation response is determined by applying the input model parameters to the wideband model. The difference between the measured and predicted formation response can be described by a cost function C that can be defined as $$C = \left( \sum_{j=1}^{N} [(W_j (\varepsilon_{model,j} \varepsilon_{r,j})/\Delta\varepsilon_{r,j})^2 + (W_j(\sigma_{model,j} \sigma_{r,j})/\Delta\sigma_{r,j})^2] \right)^{0.5} \quad (19)$$

where N is the number of frequency points measured over the wideband frequency range, $\varepsilon_{r,j}$ is the measured real part of the formation permittivity at j-th frequency, $\varepsilon_{model,j}$ is the predicted with the forward model real part of the formation permittivity at j-th frequency, $\Delta\varepsilon_{r,j}$ is the measurement uncertainty in the measured real part of the formation permittivity at j-th frequency, $\sigma_{r,j}$ is the measured real part of the formation conductivity at j-th frequency, $\sigma_{model,j}$ is the predicted with the forward model real part of the formation conductivity at j-th frequency, $\Delta\sigma_{r,j}$ is the measurement uncertainty in the measured real part of the formation conductivity at j-th frequency. In addition, weight parameters $0 < W_j < 1$ can be introduced to give different weight on measurements at different frequencies, which are employed to obtain optimum inversion results.

At low frequencies, it is often easier to measure or compute the impedance phase angle θ instead of the real permittivity. In that case, the cost function can be written as $$C = \left( W \sum_{j=1}^{N_{lf}} [((\theta_{model,j}, \theta_{r,j})/\Delta\theta_{r,j})^2 + ((\sigma_{model,j}, \sigma_{r,j})/\Delta\sigma_{r,j})^2] + \sum_{j=1}^{N_{hf}} [((\varepsilon_{model,j}, \varepsilon_{r,j})/\Delta\varepsilon_{r,j})^2 + ((\sigma_{model,j}, \sigma_{r,j})/\Delta\sigma_{r,j})^2] \right)^{0.5} \quad (20)$$

where $\theta_{model,j}$ and $\theta_{r,j}$ are the predicted and measured impedance phase angles, respectively, $N_{lf}$ is the number of low-frequency data points, $N_{hf}$ is the number of high-frequency data points, and W is the weight factor for the low-frequency data. In this equation for the cost function, the first summation is over the low frequency data points, and the second summation is over the high frequency data points. It is noted that if two different models are being used for the high and low frequency ranges, then these two cost functions can still be used, but the predicted values for the permittivity, conductivity and phase shift will come from the different models depending on the frequency range.

Figure 2:
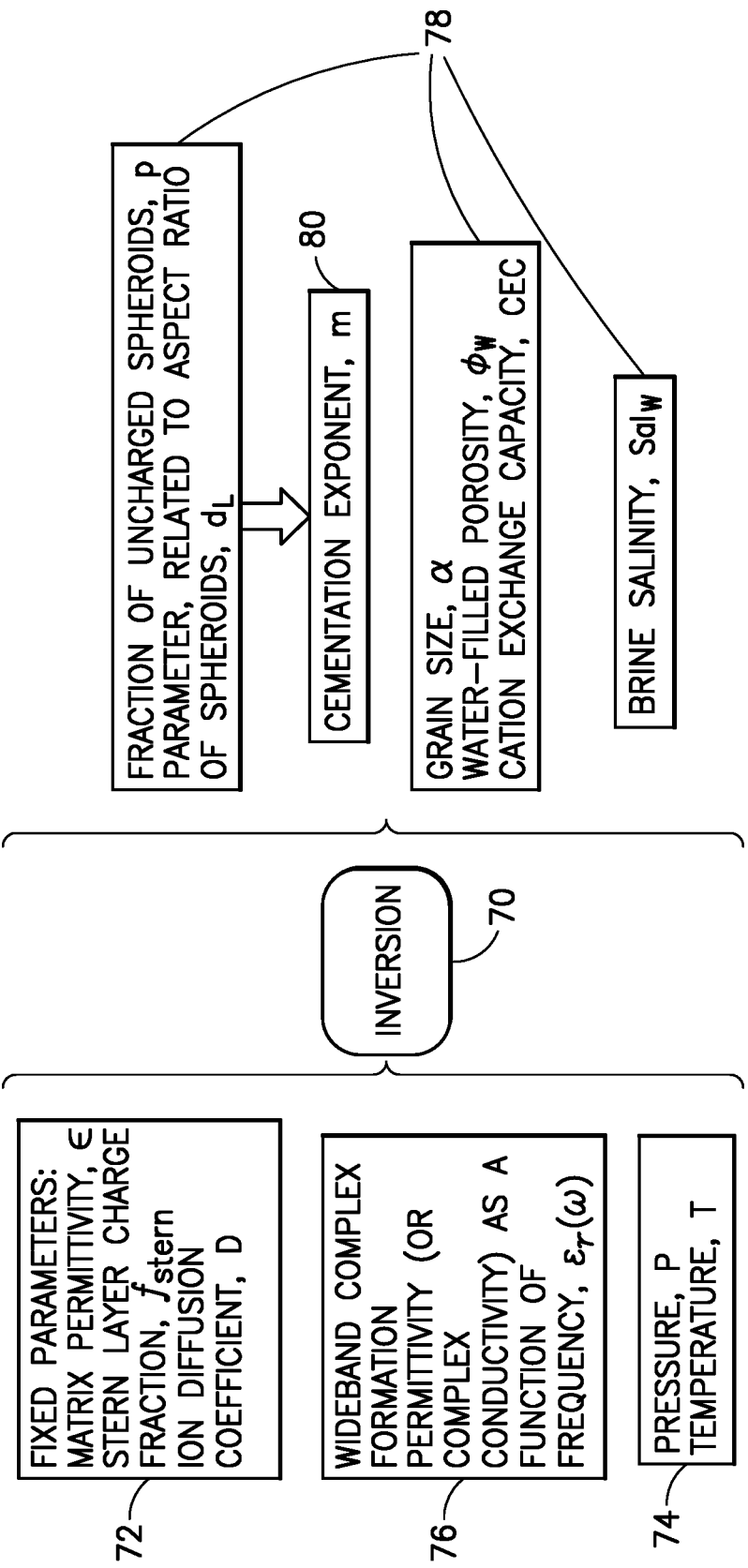
FIG. 2 is a diagram showing the input and output parameters and workflow of a wideband EM inversion.

The goal of the wideband inversion procedure is to minimize the value of cost function by adjusting input model parameters. The required inputs and produced outputs of the wideband data inversion 70 are shown in FIG. 2, including fixed parameters inputs 72 such as matrix permittivity (e.g., determined using a borehole geochemical tool or other borehole tools such as the "triple-combo"), Stern layer charge fraction, ion diffusion coefficient, measured parameter inputs 74 such as pressure and temperature, and calculated inputs 76 such as the wideband complex formation permittivity or conductivity as a function of frequency. Outputs 78 of the wideband inversion procedure may include the parameters such as grain size a, water-filled porosity $\phi_w$, CEC, water salinity $Sal_w$, the fraction of uncharged spheroids p, and a parameter related to the aspect ratio of spheroids $d_L$. Other parameters such as the cementation exponent m can be calculated at 80 from the outputs obtained as a result of the wideband inversion procedure using equation (11). Various algorithms known in the art can be utilized to achieve cost function minimization. See, e.g., Ben-Israel, A. "A Newton-Raphson Method for the Solution of Systems of Equations," Journal of Mathematical Analysis and Applications, Vol. 15(2), 1966, pp. 243-252; and More', J. J., "The Levenberg-Marquardt Algorithm: Implementation and Theory", Numerical Analysis, Springer Berlin Heidelberg, 1978, pp. 105-116. Other cost functions or weighting schemes in respect to measurement uncertainty can be employed to obtain optimum inversion results.

As previously described, Spectral Induced polarization (SIP) measurements are spectral complex conductivity measurements of earth formations made utilizing a frequency range from a fraction of a Hz to kHz's. For purposes herein, "complex conductivity" is to be understood as a complex-valued conductivity that is the sum of a real (or in-phase) conductivity component and an imaginary (or quadrature) conductivity component. SIP sensitive to formation parameters controlling its hydraulic properties and several models for permeability prediction were proposed in Weller, A. et al., "Permeability prediction based on induced polarization: Insights from measurements on sandstone and unconsolidated samples spanning a wide permeability range", Geophysics, 80(2), D161-D173 (2015) (hereinafter referred to as "Weller"); and in Revil, A., et al., "Determination of permeability from spectral induced polarization in granular media", Geophysical Journal International, 181(3), 1480-1498 (2010) (hereinafter referred to as "Revil 2010"); and in Revil, A., et al., "Predicting permeability from the characteristic relaxation time and intrinsic formation factor of complex conductivity spectra", Water Resources Research, 51(8), pp. 6672-6700 (hereinafter referred to as "Revil 2015"). Models presented by Weller are based on empirical correlations between the formation factor, imaginary conductivity and the hydraulic permeability. The model proposed by Revil 2015 combines the peak relaxation time derived from the SIP imaginary conductivity (or phase) spectra, the diffusion coefficient of the counterions in the Stern layer, and the formation factor to predict the hydraulic permeability. While these models demonstrate that permeability determinations based on SIP measurements are feasible, these models require a knowledge of the electrical formation factor derived from performing multi-salinity measurements on a core sample or an assumed value which can vary significantly between formations and has a strong impact on the permeability prediction.

According to one embodiment a method is described to derive permeability from the wideband EM measurements in combination with a wideband EM model, such as described in previously incorporated co-owned U.S. application Ser. No. 15/336,494. This method determines parameters which are used to estimate permeability from wideband EM measurements with temperature and the permittivity of the dry mineral phase (matrix permittivity), and optionally pressure as inputs. This method is applicable for well logging as the parameters used can be measured by logging tools.

In a further embodiment, a method is described to derive permeability from the low-frequency EM measurements in combination with a wideband EM model, such as the models presented in previously incorporated co-owned U.S. application Ser. No. 15/336,494, with an input of formation porosity and water salinity. The formation porosity can be measured from nuclear logs. The formation water salinity parameter will require either an assumption based on formation water salinity catalogues or local knowledge, or on a formation fluid sampling borehole tool such as the Modular Formation Dynamics Tester (MDT®).

The wideband electromagnetic response data is derived from EM measurements of the rock sample at frequencies that fall within a wideband of frequencies, wherein the wideband of frequencies includes a low frequency sub-band that is sensitive to conductivity of the rock sample and a high frequency sub-band that is sensitive to the permittivity of the rock sample. In embodiments, the low frequency sub-band includes one or more frequencies less than 100 KHz, and the high frequency sub-band includes one or more frequencies greater than 10 MHz.

Weller provides an empirical relationship between the formation factor, F, the imaginary conductivity, σ*, measured at 1 Hz, and the hydraulic permeability, k according to $$k = \frac{2.66 \cdot 10^{-7}}{F^{5.35} \sigma^{0.66}}. \quad (21)$$

Equation (21) was derived from measurements on samples saturated with 0.1 S/m brine. The imaginary conductivity measured on samples saturated with different brine salinities is corrected back to the value expected for the 0.1 S/m brine according to $$\sigma(\sigma_f) = C_f \sqrt{\frac{\sigma_f}{\sigma_w}} \sigma(\sigma_w) \quad (22)$$

where $C_f = 1$ for sodium chloride solution, $\sigma_w$ is the conductivity of the brine saturating the sample, and $\sigma_w = 0.1$ S/m. Equations (21) and (22) provide permeability estimates in the units of $m^2$. To convert this value to the units of mD the value is multiplied by a conversion coefficient, units=$1.01 \cdot 10^{15}$.

The advantage of the Weller model is that it can be applied to cases when the imaginary conductivity spectra does not have a peak as is required by Revil 2015. The disadvantages of this model are its empirical nature, which can limit its applicability, and its strong dependence on the formation factor value, which can amplify errors in estimating the permeability.

Revil 2015 introduced a permeability model based on the characteristic relaxation time, $\tau_0$, and formation factor, F of the low-frequency complex conductivity spectra according to $$k = \frac{D_{(+)} \tau_0}{4F} \quad (23)$$

where $D_{(+)}$ is the diffusion coefficient of the counterions in the Stern layer and k is the hydraulic permeability. In Revil 2015, the diffusion coefficient value is set to $D_{(+)} = 1.3 \cdot 10^{-12}$ $m^2 s^{-1}$. This value corresponds to aluminosilicates (clays) and silicates contaminated with alumina. Even small amounts of alumina contamination are sufficient, which is almost always present in oilfield sandstones. Revil 2015 also suggested an alternative equation for the permeability with the factor of 4 in equation (23) omitted. Also, the characteristic relaxation time is derived from the frequency of the peak, $f_p$, of the complex conductivity spectra according to $$\tau_0 = \frac{1}{2\pi f_p} \quad (24)$$

The above equations provide permeability estimate in the units of $m^2$. To convert this value to the units of millidarcies, the permeability estimate is multiplied by the conversion coefficient, units=$1.01 \cdot 10^{15}$.

The advantage of the Revil 2015 model is that it is physics-based, it employs additional information regarding characteristic relaxation time that is linked to the characteristic length scale of the pore space, and it is not overly dependent on the formation factor value. In addition, extension of this model to higher temperatures is relatively straightforward through the temperature dependence of the diffusion coefficient. The disadvantage of the Revil 2015 model is the requirement that a peak in the imaginary conductivity spectra be observed, which is not always the case.

Turning now to FIG. 3a, according to embodiments, permeability determinations at locations in formations traversed by a borehole are made as follows. At 110a, an induced polarization logging tool is run in the borehole and low-frequency complex conductivity spectra are measured at depths in the formation of interest. At 120a, determinations of values for the rock porosity, φ, brine salinity and volumetric fraction of the uncharged ellipsoidal inclusions are made for locations in the formation of interest. In one embodiment, the rock porosity is determined utilizing a tool such as the Compensated Neutron Log Tool® which provides a log of formation porosity. In one embodiment, determinations of the fraction of the uncharged ellipsoidal inclusions are made by setting the fractions equal to the fractions of clay determined at the locations of interest utilizing a tool such as the Elemental Capture Spectroscopy sonde (ECS®) which provides a log which may include clay fraction, or using a gamma ray tool which may also provide clay fraction information. In another embodiment, assumed values may be utilized for the fraction of uncharged ellipsoidal inclusions, as this parameter does not have a strong impact on the inversion results. The brine salinity can be determined utilizing a formation fluid sampling borehole tool such as the Modular Formation Dynamics Tester tool (MDT®) or it may be estimated from other sources such as local knowledge or formation water salinity catalogues. In one embodiment, the logging tools utilized for obtaining the desired information for steps 110a and 120a may be run together as part of a tool string. In one embodiment, the PLATFORM EXPRESS® technology may be utilized. In another embodiment, the logging tools may be run separately in the borehole. Regardless, with the porosity, brine salinity, and uncharged ellipsoidal inclusion fraction, the low-frequency spectra obtained at 110a are inverted at 130a (utilizing the wideband EM model) for each depth in the formation for the major charged grain radius, a, the cation exchange capacity CEC and the aspect ratio of the uncharged ellipsoidal inclusions. At 140a, the cementation exponent for each depth is calculated from the inverted aspect ratio and the volume fraction of the spheroidal inclusions as described in previously incorporated U.S. Ser. No. 15/336,494 and described in the equation (11). Then, at 150a, the formation factor is determined from the porosity and the cementation exponent according to $$F=\phi^{-m} \quad (25)$$

In partially saturated reservoirs, as discussed hereinafter, equation (25) is modified with a modified cementation exponent M, such that the formation factor is determined according to $F=\phi^{-M}$. Having determined the formation factor, at 160a, a determination is made of the permeability k for each depth using an equation that relates the formation factor to permeability. For example, permeability is determined using equation (21) (which may be corrected for salinity value using equation (22) and a conversion coefficient), or equation (23) which requires a determination of the characteristic relaxation time from the frequency of the peak, $f_p$, of the complex conductivity spectra and which may also use the conversion coefficient. At 170a, the permeability may be plotted in log format as a function of depth in the borehole (as seen and discussed hereinafter with respect to FIG. 8). Then, at 180a, the permeability log may be used in making decisions regarding reservoir completion and/or simulation strategies.

In one embodiment, rather than conducting induced polarization logging at multiple frequencies, low frequency, complex conductivity measurements are obtained at a single frequency at step 110a. Then, at 120a, determinations of values for the rock porosity, $\phi$, brine salinity and volumetric fraction of the uncharged ellipsoidal inclusions are made for locations in the formation of interest. At 130a, an inversion is conducted using the wideband EM model, with the determinations made at 110a and 120a as inputs as well as dominant formation grain size as an input in order to obtain CEC, brine salinity etc. It is noted that the dominant formation grain size may be estimated from formation lithology as clays have grain size of less than two micrometers, while sandstones more often have grain sizes in the range of tens to hundreds of micrometers. The formation lithology may be obtained from a geochemical tool such as the LITHOSCANNER® or ECS® tools, or from the petrophysical analysis of other logs such as the "triple-combo". The grain size can also be obtained from local geological knowledge. The wideband model can be generalized to include grain size distribution. In addition to the dominant grain size, the term "grain size" should be understood to include a grain size distribution aspect if the model is generalized to include grain size distribution. The workflow of FIG. 3a continues as previously described, except that at step 160a, the Revil model is typically not used as it requires identification of the complex low-frequency conductivity peak which is difficult to obtain using a single frequency.

Turning now to FIG. 3b, according to embodiments, permeability determinations at locations in formations traversed by a borehole are made as follows. At 110b, tools such as an induced polarization logging tool and a dielectric scanner tool are run in the borehole to obtain low-frequency complex conductivity spectra as well as high-frequency response data which may be sensitive or even dominated by the complex electrical permittivity of the formation. At 120b, determinations of values for temperature and dry mineral matrix permittivity are made for locations in the formation of interest. In one embodiment, the dry mineral matrix permittivity is measured by a geochemical borehole tool such as the LITHOSCANNER® or ECS® tools. In another embodiment, the permittivity may be obtained from the "triple-combo" tools after analysis. In one embodiment, the logging tools utilized for obtaining the desired information for steps 110b and 120b may be run together as part of a tool string. In one embodiment, the PLATFORM EXPRESS® may be utilized. In another embodiment, the logging tools may be run separately in the borehole. Regardless, with the dry mineral matrix permittivity and temperature information, the broadband spectra obtained at 110b are inverted at 130b (utilizing a wideband EM model such as described in previously incorporated U.S. Ser. No. 15/336,494) for each depth in the formation for the major charged grain radius, a, the cation exchange capacity, CEC, the aspect ratio of the uncharged ellipsoidal inclusions, m, the formation brine salinity, $Sal_w$, and the water-filled porosity, $\phi_w$. At 140b, the cementation exponent for each depth is calculated from the inverted aspect ratio and the volume fraction of the spheroidal inclusions as described in previously incorporated U.S. Ser. No. 15/336,494 and in the equation (11). Then, at 150b, the formation factor is determined from the porosity and the cementation exponent according to $F=\phi^{-m}$. In partially saturated reservoirs, the formation factor is determined according to $F=\phi^{-M}$ where M is a modified cementation exponent as discussed hereinafter. Having determined the formation factor, at 160b, a determination is made of the permeability k for each depth using an equation that relates the formation factor to permeability. For example, permeability is determined using equation (21) (which may be corrected for salinity value using equation (22) and a conversion coefficient), or equation (23) which requires a determination of the characteristic relaxation time from the frequency of the peak, $f_p$, of the complex conductivity spectra and which may also use the conversion coefficient. At 170b, the permeability may be plotted in log format as a function of depth in the borehole (as seen and discussed hereinafter with respect to FIG. 8). Then, at 180b, the permeability log may be used in making decisions regarding reservoir completion and/or simulation strategies.

In one embodiment, rather than running tools such as an induced polarization logging tool and a dielectric scanner tool in the borehole to obtain low-frequency complex conductivity spectra as well as high-frequency response data at 110b, wideband EM logging is conducted using induced polarization (complex conductivity) at a single "low" frequency and a dielectric scanner tool to obtain high-frequency response data. At 120b, the temperature, dry mineral matrix permittivity (and optionally the pressure) are found. Then, at 130b, the high-frequency data is inverted with a high-frequency dielectric dispersion model to obtain water-filled porosity, water salinity and cementation exponent as described in Seleznev, N. V. et al., "Formation properties derived from a multi-frequency dielectric measurement", SPWLA 47th Annual Logging Symposium, Society of Petrophysicists and Well-Log Analysts (January 2006), or with the model described in U.S. patent application Ser. No. 14/875,077 entitled "Method of Determining CEC and Other Properties from Multi-Frequency Dielectric Measurements", which is herein incorporated by reference in its entirety. Other dielectric dispersion models applicable to interpret the dielectric dispersion logs can be used as well. Then, the workflow of FIG. 3b continues as previously described, except that at step 160b, the Revil model is typically not used as it requires identification of the complex low-frequency conductivity peak which is difficult to obtain using a single frequency.

In another embodiment, rather than running tools such as an induced polarization logging tool and a dielectric scanner tool in the borehole to obtain low-frequency complex conductivity spectra as well as high-frequency response data at 110b, wideband EM logging is conducted using induced polarization (complex conductivity) at a single "low" frequency and a dielectric scanner tool to obtain high-frequency response data. At 120b, the temperature, dry mineral matrix permittivity (and optionally the pressure) are found. At 130b, an inversion is conducted using the wideband EM model, with the determinations made at 110b and 120b as inputs as well as dominant formation grain size as an input in order to obtain CEC, brine salinity etc. As in a previously-discussed embodiment, the dominant formation grain size may be estimated from formation lithology using a geochemical tool or from local geological knowledge. The workflow of FIG. 3b continues as previously described, except that at step 160b, the Revil model is typically not used as it requires identification of the complex low-frequency conductivity peak which is difficult to obtain using a single frequency.

Steps analogous to steps 110a-160a and 110b-160b, but without the use of borehole logging tools, were carried out as part of a test on a set of quarried sandstones. The rock collection included Berea 100, Berea 300, Berea 400, Berea 500 and Massillon 1066 sandstones. Sandstones were cut into 1.5" in diameter and 1.5" in length solid cylindrical samples. These sandstone samples underwent standard laboratory characterization including measurements of gas porosity and grain density. Petrophysical properties of the sandstones which had relatively similar porosities in the range of 0.18-0.24 V/V are given in Table A:

TABLE A

Petrophysical properties of sandstones.

| Rock Type | Grain Density g/cc | Porosity, V/V | Permeability, mD |
|---|---|---|---|
| M1066 | 2.65 | 0.24 | 2139 |
| B500 | 2.66 | 0.23 | 716 |
| B400 | 2.66 | 0.23 | 1005 |
| B300 | 2.65 | 0.21 | 314 |
| B100 | 2.67 | 0.18 | 202 |

The samples (plugs) were saturated with 0.1 ppk NaCl brine in a pressure-vacuum saturator. After saturation, samples were left in brine for several days to ensure that rocks come into equilibrium with the brine. Then, for one set of samples, a set of SIP measurements (such as discussed above with respect to step 110a) were carried out. Brine conductivity and temperature were measured before and after the SIP measurement. Subsequently, the plugs were cleaned using Soxhlet extraction in methanol and re-saturated with 5 ppk NaCl brine. SIP measurements were repeated on the same set of samples. The brine salinity, volume fraction of uncharged spheroidal inclusions, and the porosity of the samples were determined (such as discussed above with respect to step 120a) as set forth in Table B for the first set of SIP measurements.

TABLE B

Input parameters, 0.1 ppk dataset inversion.

| Sample | $Sal_w$, ppk | P | Porosity, V/V |
|---|---|---|---|
| Berea 300 | 0.098 | 0.036 | 0.21 |
| Berea 400 | 0.097 | 0.050 | 0.23 |
| Berea 500 | 0.094 | 0.052 | 0.23 |
| Mass. 1066 | 0.094 | 0.017 | 0.24 |
| Berea 100 | 0.100 | 0.037 | 0.18 |

The input parameters of Table B together with the SIP data were then inverted (per step 130a) using the wideband EM model to obtain determinations of parameters as set forth in Table C.

TABLE C

Inverted parameters for the 0.1 ppk dataset.

| Sample | m | a, μm | CEC, meq/100 gr |
|---|---|---|---|
| Berea300 | 1.71 | 122 | 0.060 |
| Berea400 | 1.56 | 151 | 0.065 |
| Berea500 | 1.63 | 149 | 0.071 |
| Mass.1066 | 1.95 | 164 | 0.046 |
| Berea 100 | 1.62 | 106 | 0.064 |

In Table 3 m is the cementation exponent (obtained per step 140a), a is the grain radius in microns, and CEC is the cation exchange capacity.

In a similar manner, the input parameters after the re-saturation were determined (with only the salinity having changed) as seen in Table D.

TABLE D

Input parameters, 5 ppk dataset inversion.

| Sample | $Sal_w$, ppk | P | φ, V/V |
|---|---|---|---|
| Berea 300 | 5.12 | 0.036 | 0.21 |
| Berea 400 | 5.13 | 0.050 | 0.23 |
| Berea 500 | 5.09 | 0.052 | 0.23 |
| Mass.1066 | 5.13 | 0.017 | 0.24 |
| Berea 100 | 5.13 | 0.037 | 0.18 |

The input parameters of Table D together with the low frequency spectra were then inverted using the wideband EM model to obtain determinations of parameters as set forth in Table E.

TABLE E

Inverted parameters for the 5 ppk dataset.

| Sample | m | a, μm | CEC, meq/100 gr |
|---|---|---|---|
| Berea300 | 1.87 | 87 | 0.38 |
| Berea400 | 1.83 | 100 | 0.37 |
| Berea500 | 1.88 | 104 | 0.39 |
| Mass.1066 | 1.77 | 109 | 0.32 |
| Berea 100 | 1.82 | 76 | 0.36 |

Using a porosity values and the cementation exponents obtained by the wideband model inversion, the formation factors for the samples were calculated (per step 150a). The formation factors were further used to calculate sample permeabilities (per step 160a) with both the Weller and the Revil 2015 models (using equation (21) and equation (23) with the factor 4 omitted, respectively). In addition, for the Revil 2015 model, the characteristic relaxation times were determined from the complex conductivity spectra as described above.

Figure 4:
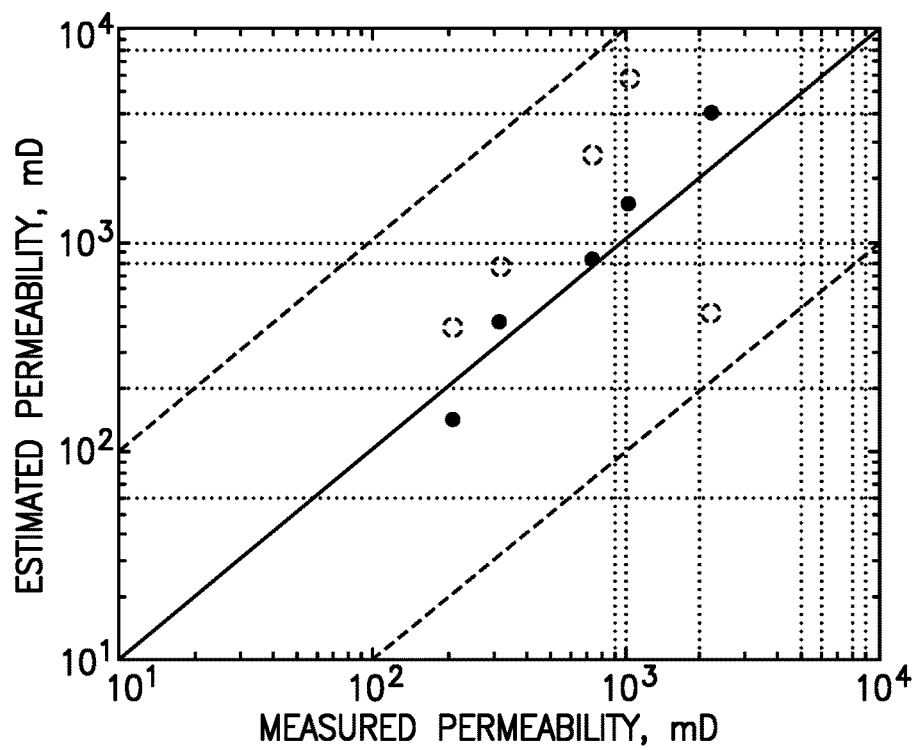
FIG. 4 depicts a permeability estimate with a Weller model on cores saturated with 0.1 ppk NaCl brine (open dot) and 5 ppk NaCl brine (solid dot)

The Weller model performance is shown in FIG. 4. Permeability predictions for the 5 ppk case (solid dots) are close to actual measured permeabilities. Permeability prediction for the 0.1 ppk case shows more scatter and stronger deviation from actual measurements. The SIP measurement sensitivity to the cementation exponent, m, at 0.1 ppk salinity is low and it translates into higher uncertainty in the calculated formation factors, which, in turn effects permeability prediction with the Weller model.

Figure 5:
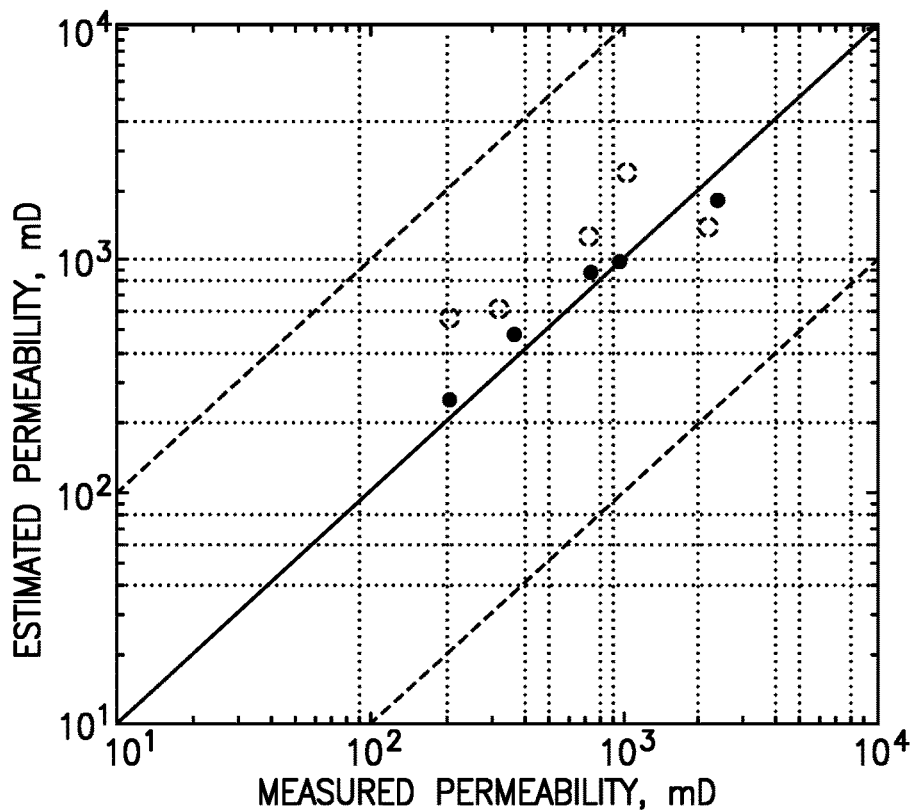
FIG. 5 depicts a permeability prediction with Revil 2015 model on cores saturated with 0.1 ppk NaCl brine (open dot) and 5 ppk NaCl brine (solid dot)

The Revil 2015 model performance is shown in FIG. 5. Permeability predictions for the 5 ppk case are good and are close to actual measurements made on the samples. Permeability predictions for the 0.1 ppk case show more deviation, but appears better than the values obtained utilizing the Weller model for the 0.1 ppk case. Thus, according to one aspect, it appears that at least where the wideband inversion utilized only lower frequency SIP measurements as inputs, the Revil 2015 model is more robust than the Weller model as its predictions are less sensitive to the uncertainties in the formation factor.

According to another aspect, twin samples were cut from the same rock types for the dielectric dispersion measurements. A combination of both the SIP and dielectric measurement techniques allowed characterization of the electromagnetic rock properties over 12 decades in frequency from milliHertz to GigaHertz.

The availability of the wideband dielectric spectroscopy data allowed for the inversion for an extended set of petrophysical parameters including water-filled porosity, water salinity, the aspect ratio of uncharged spheroids, the volume fraction of uncharged spheroids, the radius of the charged spherical particles, and CEC. The cementation exponent was calculated from the aspect ratio and volume fraction of the uncharged spheroids as previously described. The input parameters required by the wideband inversion (per step 120b) were the measurement temperature and the permittivity of the dry mineral matrix. The matrix permittivity was assumed to be 4.65 for all samples.

For the wideband inversion, rock samples of Berea 400 and Berea 500 were selected due to their inherent homogeneity. The experimental data in the high- and low-frequency ranges were simultaneously inverted with the wideband model (per step 130b). The petrophysical parameters inverted from the wideband data are given in Tables F and G as:

TABLE F

Wideband inversion results for the 0.1 ppk data.

|  | $\phi_w$ | Sal$_w$, ppk | m | a, μm | CEC, meq/100 gr |
|---|---|---|---|---|---|
| Berea400 | 0.24 | 0.21 | 2.10 | 153 | 0.08 |
| Berea500 | 0.21 | 0.29 | 2.23 | 152 | 0.09 |

TABLE G

Wideband inversion results for the 5 ppk data

|  | $\phi_w$ | Sal$_w$, ppk | m | a, μm | CEC, meq/100 gr |
|---|---|---|---|---|---|
| Berea400 | 0.24 | 5.15 | 1.85 | 100 | 0.39 |
| Berea500 | 0.21 | 4.95 | 1.76 | 104 | 0.39 |

Figure 6:
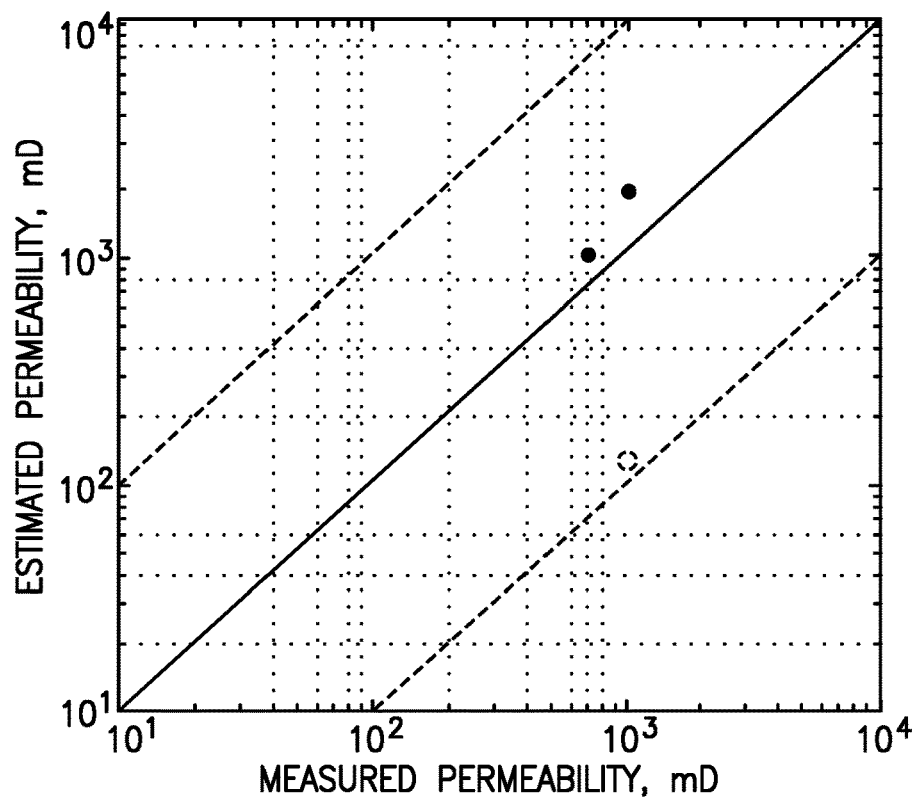
FIG. 6 depicts a permeability estimate from the wideband EM data with Weller model on cores saturated with 0.1 ppk NaCl brine (open dot) and 5 ppk NaCl brine (solid dot)
Figure 7:
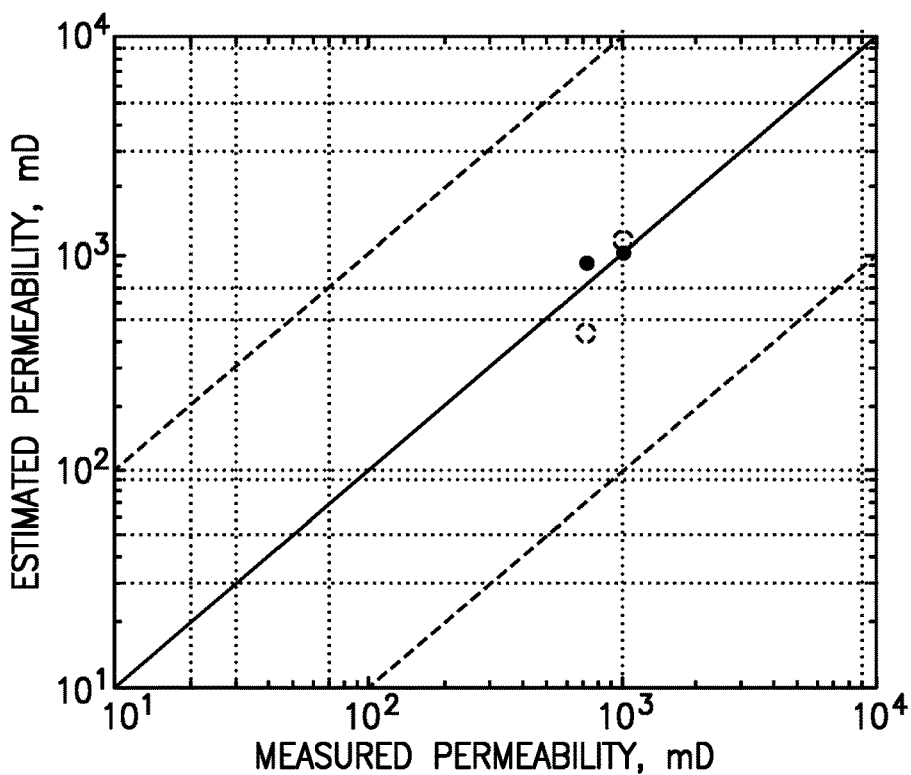
FIG. 7 depicts a permeability prediction from the wideband EM data with Revil 2015 model on cores saturated with 0.1 ppk NaCl brine (open dot) and 5 ppk NaCl brine (solid dot)

The formation factors were calculated using the inverted water-filled porosity and the inverted cementation exponents from the wideband EM data (per step 150b). Using the formation factors, permeability was determined (per step 160b) using both the Weller (2015) and Revil (2015) permeability models. The permeability results are shown in FIG. 6 for the Weller (2015) model and in FIG. 7 for the Revil (2015) model. As seen in FIG. 6, the wideband EM permeability determinations made with Weller model produced good results for the 5 ppk dataset (solid dots). However, the results were not as good for the 0.1 ppk dataset (open dots) due to its high sensitivity to the formation factor values. As seen in FIG. 7, the wideband EM permeability prediction in combination with the Revil (2015) model produced good results for both salinities as, according to one aspect, the Revil (2015) model uses additional information of the characteristic relaxation time and is more robust at different salinities.

According to another aspect, when the formation fluid contains other fluid phases such as oil and gas in addition to the brine, the formation is considered to be partially saturated. The wideband model can be generalized to the partial saturation case, for example, by the addition of the hydrocarbon phase, and this can be achieved by combining it with the matrix phase into a single "non-conductive" phase with the Complex Refractive Index Method (CRIM) or any other dielectric mixing law as described in previously incorporated U.S. Ser. No. 15/336,494.

In the case of partially saturated formation the wideband EM data inversion outputs exponent, MN, instead of the cementation exponent, m, as is the case for fully-brine saturated formations. The exponent MN can be related to the cementation, M, and the saturation, N, exponents in the Archie's equation as follows:

$$\phi_w^{MN} = \phi_t^M S_w^N \qquad (26)$$

where $\phi_w$ is the water-filled porosity, $\phi_t$ is the total porosity, $S_w$ is the water saturation. The water saturation by definition is $S_w = \phi_w/\phi_t$.

As previously described, a determination of the water-filled porosity, $\phi_w$, is an output of the wideband inversion. The total porosity, $\phi_t$, can be determined from nuclear logs. If external knowledge is available on the value of the saturation exponent or a good assumption can be made (e.g., N=2, or N=M), then a determination of the cementation exponent, M, may be made according to:

$$M = \frac{\log(\phi_w^{MN} S_w^N)}{\log \phi_t}. \qquad (27)$$

Using the cementation exponent M for the partially saturated formation situation, the formation factor may be determined according to F=$\phi_t^{-M}$ (instead of F=$\phi^{-m}$) as previously described The remainder of the workflow is the same as for the fully saturated case.

Figure 8:
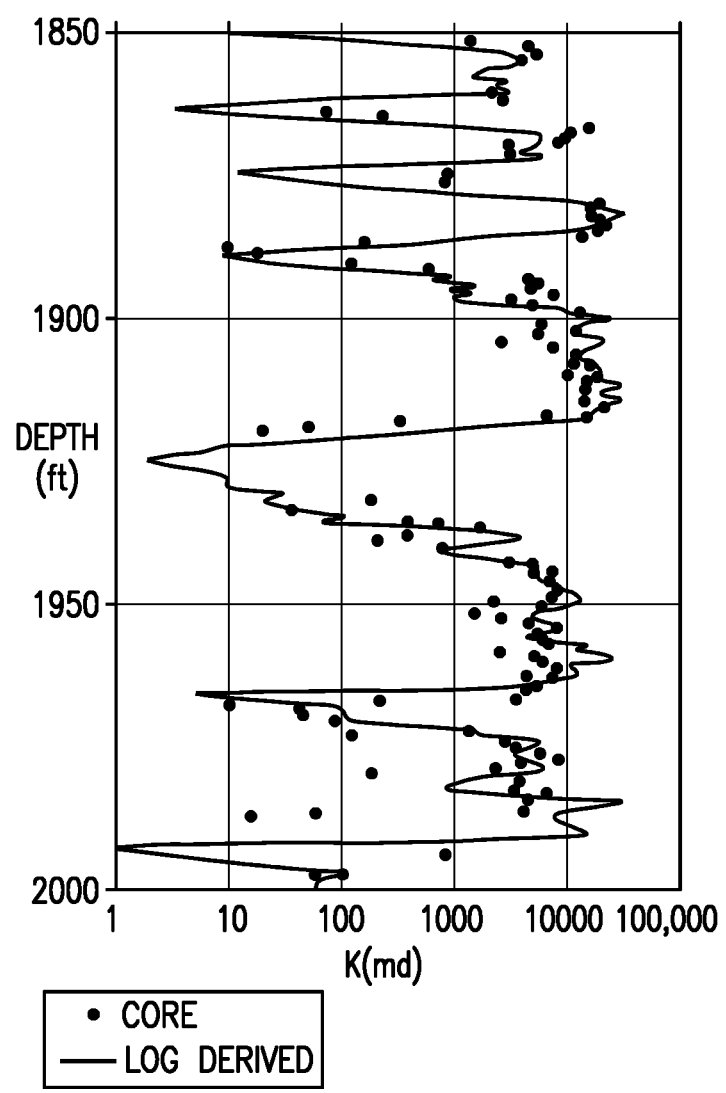
FIG. 8 depicts a permeability log.

Turning now to FIG. 8, a permeability log of a formation is shown in a solid line such as might get generated at steps 170a or 170b of FIGS. 3a and 3b utilizing the workflow of FIG. 3a or 3b. FIG. 8 also shows permeability values obtained from cores of the formation and reveals that the permeability log generated agrees well with the core-sample-derived permeability over a depth of approximately 150 feet in the formation. Using the permeability log, decisions with respect to producing hydrocarbons from the formation can be made (per steps 180a and 180b of FIGS. 3a and 3b). Thus, by way of example, the permeability log of FIG. 8 reveals a high-permeability layer (e.g., about 15000 millidarcies) at a depth of approximately 1900 feet to approximately 1920 feet. Such a formation layer can often be produced without any additional reservoir stimulation providing the fluid is not too viscous and accordingly a decision can be made to produce hydrocarbons from that layer. Also by way of example, the permeability log shows a low-permeability layer (e.g., typically under 10 mD) from approximately 1922 feet to approximately 1928 feet. Such a low-permeability layer may be difficult to produce economically, and so, accordingly, a decision may be made not to attempt to produce hydrocarbons from that layer. Alternatively, a decision may be made to utilize reservoir simulation in an attempt to produce hydrocarbons from that layer.

Figure 9:
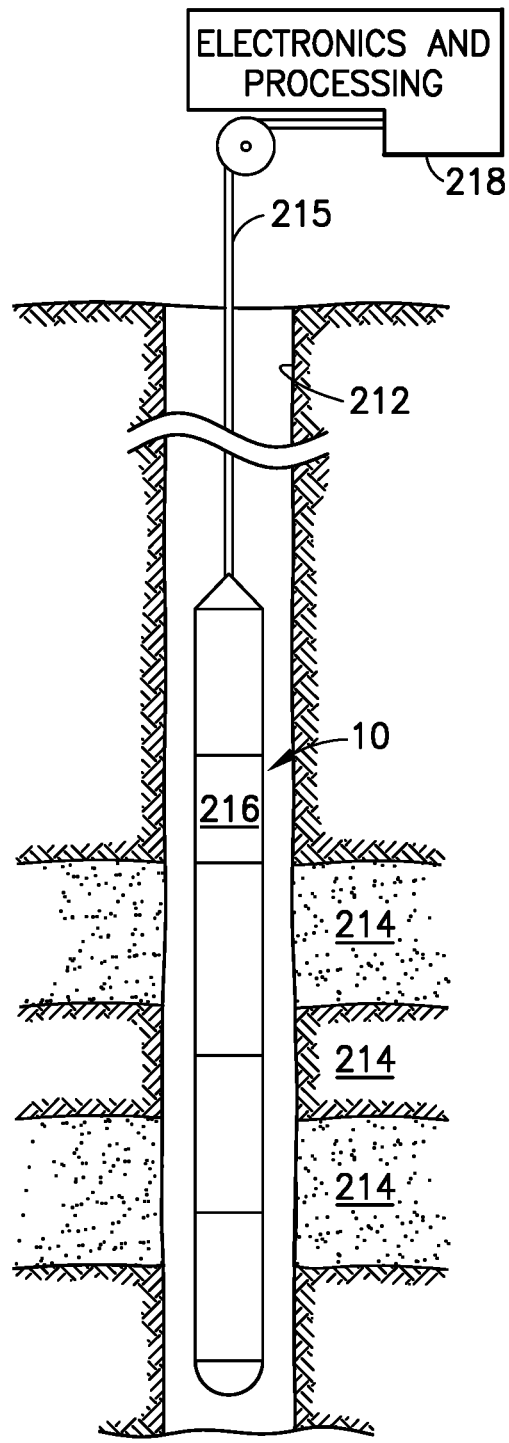
FIG. 9 depicts a logging system in a formation of interest.

A basic logging system for undertaking the workflow of FIG. 3a or 3b and generating a permeability log such as shown in FIG. 8 is shown in FIG. 9. The logging system 200 of FIG. 9 is shown including a borehole tool 210 extended in a borehole (wellbore) 212 traversing a formation 214. The tool 210 is shown suspended from the lower end of a multiconductor cable 215 that is spooled in a usual fashion on a suitable winch (not shown) on the formation surface. On the surface, the cable may be electrically coupled to an electrical control system 218. The tool includes an elongated body that may include EM sources and detectors (not shown). The tool may also include nuclear (gamma ray) sources and detectors and other sources and detectors (not shown). The surface control system 218 may communicate with the tool via a downhole control system 216. The downhole control system 216 may also process information detected by the detectors of the tool and process them for transmission uphole. The electronics and control system 218 may include processors for processing raw and/or pre-processed information. Thus, by way of example, for each location of interest in the borehole, the electronics and control system 218 may conduct the inversion discussed with reference to FIG. 1 in order to generate values for parameters such as grain size a, water-filled porosity $\phi_w$, CEC, etc. System 218 may also generate a determination of a cementation exponent (m or M) as a function of depth in the formation, a determination of the formation factor F as a function of depth in the formation, and a determination of the permeability k, as a function of depth in the formation. System 218 may then plot the permeability (and any other log information of interest) as a function of depth in the formation in the form of a log (e.g., FIG. 8) which may be on paper or in electronic form (e.g., on a monitor).

Some of the methods and processes described above, can be performed by a processor. For example, the wideband EM inversion requires very complex processing. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims. Moreover, embodiments described herein may be practiced in the absence of any element that is not specifically disclosed herein.

In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method for determining the permeability of a formation traversed by a borehole, comprising:
   running at least one borehole tool having electromagnetic (EM) sensors and measuring therewith a low-frequency complex conductivity at least one frequency;
   running additional borehole tools in the borehole and determining therefrom a plurality of formation parameters;
   for each depth of interest in the formation, utilizing said plurality of formation parameters and said low-frequency complex conductivity as data inputs in a wideband EM model, and conducting therewith a data inversion to provide a plurality of outputs including water-filled porosity, and cation-exchange capacity (CEC) from which a cementation exponent may be calculated;
   finding the cementation exponent of the formation for each depth of interest in the formation;
   finding a formation factor for each depth of interest in the formation from said cementation exponent at each depth of interest in the formation;
   determining a permeability value for each depth of interest in the formation from the formation factor for each depth of interest in the formation;
   presenting said permeability value for each depth of interest in the formation as a log.

2. The method of claim 1, wherein:
   said measuring a low-frequency complex conductivity at least one frequency comprises measuring a low-frequency complex conductivity spectrum.

3. The method of claim 2, wherein:
said plurality of formation parameters include rock porosity, $\phi$, brine salinity and volumetric fraction of the uncharged ellipsoidal inclusions.

4. The method of claim 3, wherein:
said formation factor is found according to $F=\phi^{-m}$, where F is the formation factor, $\phi$ is said rock porosity, and m is said cementation exponent.

5. The method of claim 4, wherein:
said permeability value is found as a function of said formation factor and an imaginary conductivity $\sigma^*$.

6. The method of claim 5, wherein:
said function is $$k = \frac{2.66 \cdot 10^{-7}}{F^{5.35} \sigma^{066}},$$

where k is said permeability.

7. The method of claim 4, wherein:
said plurality of outputs of said data inversion includes grain size; and
said permeability value is found as a function of said formation factor, a diffusion coefficient of counterions in a Stern layer, $D_{(+)}$, and a characteristic relaxation time, $\tau_0$.

8. The method of claim 7, wherein:
said function is $$k = \frac{D_{(+)} \tau_0}{4F}$$

where k is said permeability, and said characteristic relaxation time is derived from the frequency of a peak, $f_p$, of the complex conductivity spectrum according to $$\tau_0 = \frac{1}{2\pi f_p}.$$

9. The method of claim 3, wherein:
said formation factor is found according to $F=\phi^{-M}$, where F is the formation factor and M is said cementation exponent, and where $$M = \frac{\log(\phi_w^{MN} S_w^N)}{\log \phi_t}$$

where $\phi_w$ is the water-filled porosity, $\phi_t$ is the total porosity, $S_w$ is the water saturation, and N is a water saturation exponent.

10. The method of claim 9, wherein:
said permeability value is found as a function of said formation factor and an imaginary conductivity $\sigma^*$.

11. The method of claim 10, wherein:
said function is $$k = \frac{2.66 \cdot 10^{-7}}{F^{5.35} \sigma^{066}},$$

where k is said permeability.

12. The method of claim 9, wherein:
said plurality of outputs of said data inversion includes grain size; and
said permeability value is found as a function of said formation factor, a diffusion coefficient of counterions in a Stern layer, $D_{(+)}$, and a characteristic relaxation time, $\tau_0$.

13. The method of claim 12, wherein:
said function is $$k = \frac{D_{(+)} \tau_0}{4F}$$

where k is said permeability, and said characteristic relaxation time is derived from the frequency of a peak, $f_p$, of the complex conductivity spectrum according to $$\tau_0 = \frac{1}{2\pi f_p}.$$

14. The method of claim 1, wherein:
said running at least one borehole tool having electromagnetic (EM) sensors further comprises measuring high-frequency EM response data, said-high-frequency EM response data being provided as a data input into the wideband EM model.

15. The method of claim 14, wherein:
said plurality of formation parameters include temperature, pressure and dry mineral matrix permittivity.

16. The method of claim 14, wherein:
said formation factor is found according to $F=\phi^{-m}$, where F is the formation factor, $\phi$ is said rock porosity, and m is said cementation exponent.

17. The method of claim 16, wherein:
said permeability value is found as a function of said formation factor and an imaginary conductivity $\sigma^*$.

18. The method of claim 17, wherein:
said function is $$k = \frac{2.66 \cdot 10^{-7}}{F^{5.35} \sigma^{066}},$$

where k is said permeability.

19. The method of claim 16, wherein:
said measuring a low-frequency complex conductivity at least one frequency comprises measuring a low-frequency complex conductivity spectrum,
said plurality of outputs of said data inversion includes grain size, and
said permeability value is found as a function of said formation factor, a diffusion coefficient of counterions in a Stern layer, $D_{(+)}$, and a characteristic relaxation time $\tau_0$.

20. The method of claim 19, wherein:
said function is $$k = \frac{D_{(+)} \tau_0}{4F}$$

where k is said permeability, and said characteristic relaxation time is derived from the frequency of a peak, $f_p$, of the complex conductivity spectrum according to $$\tau_0 = \frac{1}{2\pi f_p}.$$

21. The method of claim 15, wherein:
said formation factor is found according to $F=\phi^{-M}$, where F is the formation factor and M is said cementation exponent, and where $$M = \frac{\log(\phi_w^{MN} S_w^N)}{\log\phi_t}$$

where $\phi_w$ is the water-filled porosity, $\phi_t$ is the total porosity, $S_w$ is the water saturation, and N is a water saturation exponent.

22. The method of claim 21, wherein:
said permeability value is found as a function of said formation factor and an imaginary conductivity $\sigma^*$.

23. The method of claim 22, wherein:
said function is $$k = \frac{2.66 \; 10^{-7}}{F^{5.35} \sigma^{066}},$$

where k is said permeability.

24. The method of claim 21, wherein:
said measuring a low-frequency complex conductivity at least one frequency comprises measuring a low-frequency complex conductivity;
said plurality of outputs of said data inversion includes grain size; and
said permeability value is found as a function of said formation factor, a diffusion coefficient of counterions in a Stern layer, $D_{(+)}$, and a characteristic relaxation time $\tau_0$.

25. The method of claim 24, wherein:
said function is $$k = \frac{D_{(+)} \tau_0}{4F}$$

where k is said permeability, and said characteristic relaxation time is derived from the frequency of a peak, $f_p$, of the complex conductivity spectrum according to $$\tau_0 = \frac{1}{2\pi f_p}.$$

26. A method according to claim 1, further comprising:
using said log in completing or producing a reservoir in the formation.

27. A method for determining the permeability of a formation traversed by a borehole, comprising:
running at least one borehole tool having electromagnetic (EM) sensors and measuring therewith a low-frequency complex conductivity at least one frequency;
running additional borehole tools in the borehole and determining therefrom a plurality of formation parameters;
for each depth of interest in the formation, utilizing said plurality of formation parameters and said low-frequency complex conductivity as data inputs in a wideband EM model, and conducting therewith and without any core data a data inversion to provide a plurality of outputs from which a cementation exponent for each depth of the formation may be calculated;
finding the cementation exponent of the formation for each depth of interest in the formation;
finding a formation factor for each depth of interest in the formation from said cementation exponent at each depth of interest in the formation;
determining a permeability value for each depth of interest in the formation from the formation factor for each depth of interest in the formation;
presenting said permeability value for each depth of interest in the formation as a log.

28. The method of claim 27, wherein:
said running at least one borehole tool further comprises measuring therewith a high-frequency EM response data, said high-frequency EM response data being provided as a data input into the wideband EM model.

29. The method of claim 27, wherein:
said measuring a low-frequency complex conductivity at least one frequency comprises measuring a low-frequency complex conductivity spectrum.

30. A method according to claim 27, further comprising:
using said log in completing or producing a reservoir in the formation.

* * * * *